(No Model.)

F. H. RICHARDS.
PISTON VALVE.

No. 430,484. Patented June 17, 1890.

Witnesses:
Henry L. Reckard
Lewis C. Heermann

Inventor:
Francis H. Richards

UNITED STATES PATENT OFFICE.

FRANCIS H. RICHARDS, OF HARTFORD, CONNECTICUT, ASSIGNOR TO ECKLEY B. COXE, OF DRIFTON, PENNSYLVANIA.

PISTON-VALVE.

SPECIFICATION forming part of Letters Patent No. 430,484, dated June 17, 1890.

Application filed February 6, 1889. Serial No. 298,898. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Piston-Valves, of which the following is a specification.

This invention relates to piston-valves for use in pneumatic motors and for use as throttle-valves and in other places where a free-working and a close-working valve is required, the object being to furnish such a valve adapted to be adjusted in size to secure the requisite closeness of the fitting thereof within its cylindrical seat, substantially as hereinafter more fully set forth.

Figure 1:
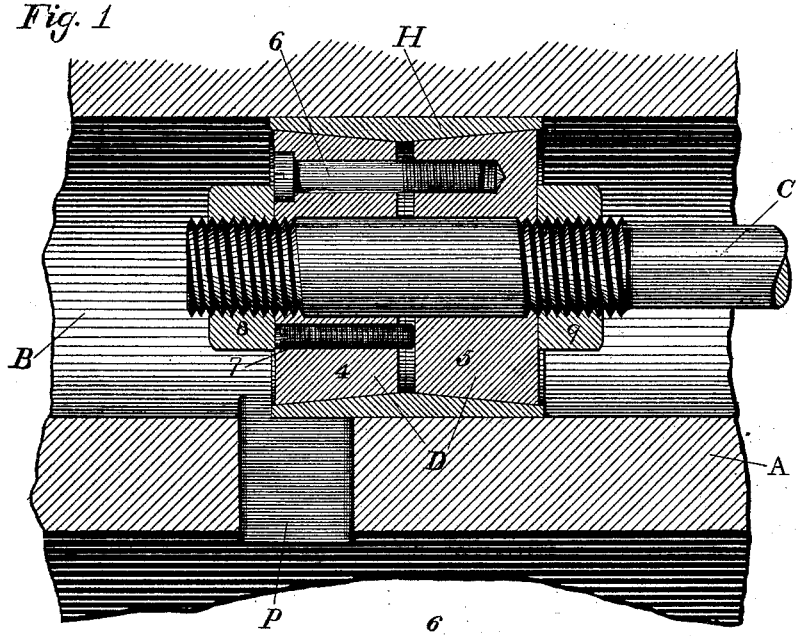
Figure 2:
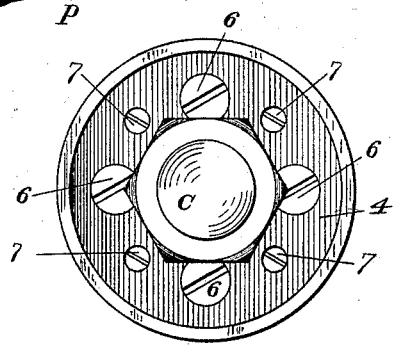

In the drawings accompanying and forming a part of this specification, Figure 1 is a longitudinal section of a piston-valve embodying my improvements. Fig. 2 is an end view of the valve. Fig. 3 is a sectional view showing the valve in one of its simplest forms.

Similar letters and numerals designate like parts in all the figures.

The structure A, in which the cylindrical valve-seat B is bored, is supposed to be a portion of an engine-cylinder or like part.

The valve-stem C has upon its outer end a core D, consisting of two parts 4 and 5, made coned or tapering inward toward each other. Surrounding these two cones is a shell H, having its bore or central opening tapering from both ends inward, so that there are within the shell two conical portions corresponding in shape with and adapted to be engaged by the peripheries of the two cones 4 and 5, forming the core D. The conical portions of the interior of the shell are, however, as shown in the drawings, made to taper down to a diameter less than that of the inner ends of the cones. Screws 6 6, passing through the outer cone 4 and tapped into the other one, serve to draw or force the two cones toward each other, while screws 7 7, tapped through the outer cone 4 and at their inner ends engaging cone 5, are employed to force and hold the cones apart. By means of the two sets of screws the cones can be adjusted to any desired distance apart and fixed as adjusted.

The core D, formed of the two adjustable cones, as described, is held in place on the valve-stem C by means of the nuts 8 and 9, screwed on the stem and engaging the ends of the outer and inner cones, respectively. With the core thus held by the nuts it can be not only securely fastened in place on the stem, but also adjusted as desired along the latter to change the position of the valve. The opposite ends of the shell H are preferably made of the same thickness where, as in motor-engines, both ends of the piston-valve are alternately used to cut off air from port P.

The material of which the shell is made should be one having elasticity, or being capable of expansion and contraction without any slotting or division of the shell. The materials which I have found in practice to be suitable for the shell are soft steel, bronze, or cast-iron, while for the core D, I have used steel. The taper of the cones and of the conical portions of the bore of the shell is made slight or at a small pitch, and that of either of the cones and the respective surface within the shell to be engaged by the cone I preferably make of the same pitch or at the same angle.

With the shell H made of steel, bronze, or cast-iron I have found that it can be considerably expanded, so as to increase its diameter without affecting its elasticity, so as to prevent its return to its original size and condition when the expanding force is removed.

The operation of my valve in connection with its seat and the port P is precisely the same as that of the ordinary unexpansible piston-valve, and need not, therefore, be described herein. The manner of adapting or fitting it to its seat, so as to make it fit the same closely, is, briefly, as follows: According as the valve is too small or too large to fit its seat properly the screws 6 6 and 7 7 are turned so as to make the cones 4 and 5 approach or recede from each other. As the cones move inward toward each other, their conical peripheries engaging the corresponding conical surfaces on the interior of the shell will force the same outward and cause a radical expansion of the shell in all directions, while as said cones are moved outward the shell will contract again, as portions of the cones of a certain diameter are successively replaced by portions of a less diameter in their engagement of the surfaces within the shell. With the conical faces within the shell corresponding in their taper with the conical peripheries of the engaging cones 4 and 5, and the outside of the shell made cylindrical, all parts of the shell can be expanded and contracted alike, as the cones are adjusted to or from each other by the screws 6 6 and 7 7, and the shell at any point in its expansion or contraction will always remain cylindrical, and can therefore be made to fit the cylindrical valve-seat with the desired degree of closeness, while being capable of free movement in or on the same. When the shell has been expanded or contracted to fit the valve-seat, the nuts 8 and 9 are screwed up against the ends of the cones 4 and 5, respectively, so as to determine and fix the position of the valve with reference to the stem C.

In practice the parts of my valve being assembled and adjusted to make the shell of the desired size constitute in effect a single piece or unitary form of valve, which can be placed upon or attached to a valve-stem in the same manner as any piston-valve head.

Having thus described my invention, I claim—

1. In a piston-valve, the combination of two conical cores bored axially to receive a valve-stem, a shell encircling them, and a screw or screws connecting said cores, whereby they may be moved toward each other, so as to vary the diameter of said shell, said screw or screws being located between the axial openings in said cores and the peripheries thereof, substantially as and for the purpose specified.

2. In a piston-valve, in combination, two conical cores, an expansible shell on said cores, a screw passing through one of said cores and into the other, whereby they may be drawn together, and a screw passing through one of said cores and abutting against the contiguous face of the other, whereby they may be separated from each other, substantially as and for the purpose specified.

3. In a piston-valve, in combination with the valve-stem and the nuts thereon, the oppositely-arranged cones on the stem between the nuts, the shell having on its inner side the oppositely-arranged conical faces, one or more screws adapted to draw the cones together, and one or more screws adapted to force and hold them apart, substantially as and for the purpose set forth.

FRANCIS H. RICHARDS.

Witnesses:
HENRY L. RECKARD,
LEWIS C. HEERMANN.